United States Patent [19]

Schmid et al.

[11] Patent Number: 5,662,738
[45] Date of Patent: *Sep. 2, 1997

[54] LUSTER PIGMENTS BASED ON MULTIPLY COATED PLATELETLIKE METALLIC SUBSTRATES

[75] Inventors: Raimund Schmid, Neustadt; Norbert Mronga, Dossenheim, both of Germany

[73] Assignee: BASF Aktiengesellschaft, Ludwigshafen, Germany

[*] Notice: The term of this patent shall not extend beyond the expiration date of Pat. No. 5,626,661.

[21] Appl. No.: 278,969

[22] Filed: Jul. 22, 1994

Related U.S. Application Data

[62] Division of Ser. No. 54,091, Apr. 30, 1993, Pat. No. 5,364,467.

[30] Foreign Application Priority Data

May 27, 1992 [DE] Germany ............... 42 175 11.9

[51] Int. Cl.$^6$ ............................................. C09C 1/62
[52] U.S. Cl. .................... 106/404; 106/417; 106/439; 106/440; 106/442; 106/456; 106/457; 106/459; 106/474
[58] Field of Search ................................ 106/417, 474, 106/439, 442, 440, 404, 456, 457, 459

[56] References Cited

U.S. PATENT DOCUMENTS

| | | |
|---|---|---|
| 3,423,229 | 1/1969 | Kompanek et al. . |
| 3,438,796 | 4/1969 | Hanke . |
| 4,076,551 | 2/1978 | Bernhard et al. ............. 106/474 |
| 4,292,087 | 9/1981 | Bell . |
| 4,328,042 | 5/1982 | Ostertag et al. . |
| 4,618,375 | 10/1986 | Patil et al. . |
| 4,954,176 | 9/1990 | Minohara et al. . |
| 4,978,394 | 12/1990 | Ostertag et al. . |
| 5,059,245 | 10/1991 | Phillips et al. . |
| 5,271,771 | 12/1993 | Franz et al. ................. 106/415 |
| 5,286,291 | 2/1994 | Bernhardt et al. ............ 106/417 |

FOREIGN PATENT DOCUMENTS

| | | |
|---|---|---|
| 0 328 906 A3 | 8/1989 | European Pat. Off. . |
| 0 499 864 A2 | 8/1992 | European Pat. Off. . |
| 0 525 526 A1 | 2/1993 | European Pat. Off. . |

OTHER PUBLICATIONS

European Search Report in European Patent Application No. 93107854.7, dated Jul. 30, 1993.

*Primary Examiner*—Mark L. Bell
*Assistant Examiner*—Scott L. Hertzog
*Attorney, Agent, or Firm*—Oblon, Spivak, McClelland, Maier & Neustadt, P.C.

[57] ABSTRACT

Luster pigments useful for coloring paints, printing inks, plastics, glasses, ceramic products and decorative cosmetic preparations are based on multiply coated plateletlike metallic substrates comprising A) a first, colorless or selectively absorbing layer of metal oxide, B) a second, nonselectively absorbing layer of carbon, metal and/or metal oxide, and C) if desired a third, colorless or selectively absorbing layer of metal oxide.

6 Claims, No Drawings

LUSTER PIGMENTS BASED ON MULTIPLY COATED PLATELETLIKE METALLIC SUBSTRATES

This is a divisional of application Ser. No. 08/054,091, filed Apr. 30, 1993, now U.S. Pat. No. 5,364,467.

The present invention relates to novel luster pigments based on multiply coated plateletlike metallic substrates comprising A) a first, colorless or selectively absorbing layer of metal oxide, B) a second, nonselectively absorbing layer of carbon, metal and/or metal oxide, and C) if desired a third, colorless or selectively absorbing layer of metal oxide.

The present invention further relates to the preparation of these luster pigments and to the use thereof for coloring paints, printing inks, plastics, glasses, ceramic products and decorative cosmetic preparations.

Luster or effect pigments are increasingly used in many sectors of industry, for example in automotive coatings, decorative coatings, plastics pigmentation, printing inks, in particular encaustic inks, paints and cosmetics.

Their optical effect is based on directional reflection at predominantly sheetlike, oriented metallic or strongly refractive pigment particles. According to the nature of the pigment particles, the pigments also referred to as metallic effect pigments (e.g. aluminum, zinc, copper or alloys thereof) or pearl luster pigments (e.g. based on coated mica such as muscovite, phlogopite and biotite, talc or glass).

Luster pigments may have a multiphase structure, formed by coating the starting substrates with thin films of highly refractive oxides such as chromium(III) oxide, in particular iron oxide and titanium oxide. Interference with or without absorption will in these cases result in a multiplicity of colors depending on the thickness of the oxide layer; therefore, these pigments are also called interference pigments.

As a result of the incident light being reflected directionally at the plateletlike pigment particles, coated luster pigments that are oriented, for example in a lacquer, exhibit goniochromaticity; that is, their perceived color (lightness and/or hue and/or chroma) varies with the angle of illumination or observation. These effects can be ascribed to a complex interplay of reflection and transmission of the incident light, the color of which can be affected by phenomena due to the pigment particles, such as interference in thin films and absorption by colored centers.

Oxide-coated metallic effect pigments can also be termed interference-reflection pigments, since, in the applied state, their perceived color is due to the combination of interference and reflection phenomena.

EP-A-33 457 discloses metallic interference-reflection pigments comprising $Fe_2O_3$-coated aluminum platelets. Particularly brilliant pigments are obtainable here in the yellow to red region (from gold via orange and red to violet) when, owing to the $Fe_2O$-layer having the right thickness, its interference color is in agreement with its absorption color.

DE-A-38 13 335 (U.S. Pat. No. 4,978,394) describes interference-reflection pigments based on $TiO_2$-coated aluminum pigments, which exhibit interference colors over the entire range of the spectrum, i.e. gold, red, blue and green. To intensify the perceived color, which in metallic effect pigments is particularly weak owing to the high white light content of the reflected light, the $TiO_2$ layer is superficially reduced with ammonia at high temperatures to form dark-colored lower titanium oxides and titanium nitride. The dark layer thus applied reduces the white light content, and the pigments have a surface color corresponding to the respective interference color. The pigments may also have been coated with an additional metal oxide layer. however, in this case the reduction of the titanium dioxide with ammonia becomes problematical, since, owing to the temperatures required for this purpose, deformation of the aluminum platelets and also an exothermic reaction of $TiO_2$ with aluminum to form titanium and aluminum oxide cannot be ruled out.

It is an object of the present invention to provide novel strong metallic effect pigments which shall also be preparable in a reliable and reproducible manner.

We have found that this object is achieved by the luster pigments defined at the beginning.

We have also found a process for preparing the luster pigments, which comprises coating the metallic substrate first with a) a colorless or selectively absorbing metal oxide layer by gas phase decomposition of volatile metal compounds in the presence of oxygen and/or water vapor, then with b1) a carbon layer by thermal decomposition of oxygen-containing hydrocarbons that for every two carbon atoms contain at least one oxygen atom, with b2) a metal layer by gas phase decomposition of volatile metal compounds in an inert gas, or with b3) a nonselectively absorbing metal oxide layer by gas phase decomposition of volatile metal compounds in the presence of oxygen and/or water vapor, and if desired subsequently with c) a further colorless or selectively absorbing metal oxide layer as in step a).

We have additionally found that these luster pigments are useful for coloring paints, printing inks, plastics, glasses, ceramic products and decorative cosmetic preparations.

Suitable substrates for the pigments of the invention are all metals in platelet form known for metallic effect pigments. Examples besides copper and its alloys such as brass or bronzes are in particular aluminum and its alloys such as aluminum bronze.

Of particular advantage are aluminum platelets which are producible in a simple manner by stamping out of aluminum foil or by known atomization or grinding processes.

The size of the aluminum particles is not critical per se and can be adapted to the particular use. In general, the particles have average largest diameters of about 5–120 μm, in particular 5–40 μm. Their specific free surface area (BET) is in general from 0.5 to 5 $m^2/g$.

The surface of the aluminum particles should be substantially free of fats or other coating media. Commercial products can be used.

The luster pigments of the invention are notable for multiple coating of the metallic substrate.

The first layer (A) is formed from the customary colorless or selectively absorbing (i.e. not black) metal oxides suitable for coating interference pigments. Preferred examples are zirconium oxide, silicon oxide, tin oxide, chromium oxide, iron oxide and mixtures thereof. Particular preference is given to titanium dioxide.

The thickness of the layer (A) is not critical per se and will in general range from 1 to 500 nm, preferably from 10 to 300 nm, but care must be taken to ensure that the layer is transparent.

The second, nonselectively absorbing layer (B) consists essentially of carbon, metals, in particular those which can be applied by gas phase decomposition of volatile compounds, such as, in particular, iron, also cobalt, nickel, chromium, molybdenum and tungsten, or black metal oxides, in particular magnetite but also nickel oxide, cobalt oxide (CoO, $Co_3O_4$) and vanadium oxide ($VO_2$, $V_2O_3$) and also mixtures thereof, in particular iron with magnetite.

The black layer (B) must not of course be opaque, but must be semitransparent to light. In this way it reduces the white content of the incident and reflected light and thus brings about an enhancement of the interference of the color of the metal oxide-coated substrate and, if of appropriate thickness, will also continue the interference chain of the substrate. In general, the layer is from 5 to 200 nm, preferably from 10 to 50 nm, in thickness.

Furthermore, the luster pigments of the invention may additionally have a third layer (C) which, like layer (A), is composed of highly refractive colorless or selectively absorbing metal oxides. Here too the preference is for example zirconium oxide, silicon oxide, tin oxide and chromium oxide with iron oxide and titanium dioxide being particularly preferred. This top layer has the effect, in particular in the case of metallic layers (B), of distinctly improving resistance to outside influences.

The thickness of layer (C) is not critical per se and in general it will be about 1–400 nm, in particular 5–200 nm.

Of course, layer (C) likewise contributes to the interference of the pigment, continuing the interference chain at the location determined by the substrate coated with (A) and (B). If layer (C) is a colored oxide layer, the pigments, applied for example in paint, print or plastic, will with increasing layer thickness increasingly show the natural color of the metal oxide at higher viewing angles.

Similarly, the doubly coated luster pigments of the invention show a color flop from the interference color to black or gray.

All the layers of the luster pigments of the invention are altogether notable for a uniform, homogeneous, filmlike structure that results from the manner of preparation according to the invention and becomes evident for example in the electrical conductivity of a metal, in particular molybdenum, or else magnetite layer (B).

In the novel process for preparing the multiply coated plateletlike metallic substrates, the individual coating steps are each effected by thermal decomposition of suitable starting compounds in the presence of the substrate particles to be coated.

This coating with metal oxide and metal layers [steps a), b2), b3) and optionally c)] is preferably carried out in a heatable fluidized bed reactor, as described for example in EP-A-33 457 or DE-A-38 13 335, where the uncoated or already singly or doubly coated substrate particles are initially fluidized in a fluidizing gas and heated to the temperature, in general from 70° to 350° C., required for decomposing the particular metal compound. The vaporized metal compounds and any gases required for achieving the decomposition are then introduced via separate nozzles.

The first and third layers of colorless or selectively absorbing metal oxide and also the second black layer, for example a nickel oxide or cobalt oxide layer, are deposited [steps a), b3) and c)] by decomposing volatile metal compounds, preferably carbonyls, halides, in particular chlorides, and alkoxides, not only aromatic alkoxides such as phenoxides and benzyl alkoxides but also aliphatic alkoxides, in particular $C_1$–$C_4$-alkoxides such as n-, iso- and tert-butoxides, preferably methoxides and ethoxides and particularly preferably n- and iso-propoxides. The carbonyls are here advantageously oxidized by oxygen in a mixture with nitrogen (e.g. air), whereas the halides and alkoxides are hydrolyzed by water vapor, although in the case of the halides oxygen (or air) may be present, too. The oxygen or water vapor must be supplied in an amount which is at least that required stoichiometrically for forming the desired oxide or, in the case of the carbonyls, carbon dioxide, but it is also possible to use a small excess. The fluidizing gas used in this coating operation can be not only nitrogen but also air.

Preferred metal compounds are iron pentacarbonyl, chromium hexacarbonyl, aluminum chloride, silicon tetrachloride, tin tetrachloride, titanium tetrachloride, zirconium tetrachloride, vanadium oxychloride, titanium n-propoxide, titanium isopropoxide, zirconium n-propoxide and zirconium isopropoxide. Which metal compound is best depends in the case of step c) on the nature of the second layer already applied. If this layer is for example a metal layer, then it is preferable to use carbonyls or alkoxides.

The deposition of a metallic second layer [step b2)] is preferably effected using the corresponding metal carbonyls, in particular iron pentacarbonyl but also chromium hexacarbonyl, molybdenum hexacarbonyl or tungsten hexacarbonyl, or else nickel tetracarbonyl and dimeric cobalt tetracarbonyl, which are thermally decomposed to the respective metals in a protective gas, such as nitrogen or argon, but is also used for fluidizing the substrate.

If the second, black layer is to consist of a lower metal oxide, such as magnetite, $VO_2$ or $V_2O_3$ [step b3)], it is advantageous to hydrolyze the metal carbonyls, such as iron pentacarbonyl, or oxychlorides, such as vanadium oxychloride, with water vapor. To add the water vapor at a controlled rate, an inert carrier gas, in particular nitrogen, that is also being used for fluidizing the substrate is loaded with water vapor. If this gas phase decomposition initially deposits higher metal oxides, e.g. $V_2O_5$, they must be subsequently reduced, for example with hydrogen or ammonia, to the desired oxide.

All the coating operations are advantageously carried out by vaporizing the metal compounds in a vaporizer upstream of the reactor and transporting the resulting vapors into the reactor by means of a carrier gas, in general air or nitrogen, depending on the reaction conditions required.

To obtain homogeneous layers that enrobe the substrate uniformly and completely, the gas quantity of the metal compound should in general not be more than 5% by volume, preferably not more than 2% by volume, of the total quantity of gas in the reactor.

If, following the first metal oxide layer, a second, black layer of metal or metal oxide is to be applied, the product need not be isolated between the two coating operations; on the contrary, the second coating operation can advantageously be carried out immediately after the first coating operation in the same reactor, if desired after a small reduction in temperature and if necessary after the substitution of a different fluidizing gas. Of course, the same procedure may also be adopted if a third layer of a metal oxide is to be applied.

If the applied layer is a metal or a low metal oxide which is to form the outer layer of the pigment, it is advantageous to mix air into the fluidizing gas during cooling in order that the layer surface may be passivated by oxidation. The cooled product is then discharged in the usual manner.

To coat the metal oxide-coated substrates with a second layer of carbon it is preferable to employ oxygen-containing hydrocarbons that contain at least one oxygen atom for every two carbon atoms, such as polyvinyl alcohol, but in particular sorbitol and especially compounds of the molecular formula $(CH_2O)_n$, where n is in general from 1 to 6, especially 5 or 6, for one monomer unit. These compounds are preferably low molecular weight sugars such as glucose and dextrose, but it is also possible to use high molecular weight sugars such as starch and polymeric compounds such as polyoxymethylene.

It is advantageous to initially apply these compounds, in particular sugars, to the substrate surface in a finely divided state. For this it is particularly advantageous to prepare a thick paste composed of substrate, sugar and a suitable solvent, e.g. ethanol. However, it is also possible to stir the substrate into a sugar solution and then to filter off the substrate particles thus coated with a solvent-containing sugar film. Furthermore, substrate and particularly finely ground sugar can also be mixed dry. In general, the amount of sugar used is from 0.1 to 20% by weight, preferably from 1 to 10% by weight, based on the amount of substrate.

The thermal decomposition of the sugar layer, advantageously predried, for example in a drying cabinet or in a spray dryer, to form carbon can then be carried out in a rotary sphere furnace, in which case, depending on the starting compounds, temperatures of in general from 100° to 500° C., in particular from 200° to 400° C., are required. The thermal decomposition is preferably carried out under a protective gas such as nitrogen. The resulting water evaporates, and the carbon remains behind on the substrate as a homogeneous, optically semitransparent film. Of particular advantage when coating with carbon according to the invention are the low reaction temperatures below 500° C., which prevent damage to the substrate material.

This may as usual be followed, if desired, by a third coating with colorless or selectively absorbing metal oxide.

Of course, the starting material used in the process of the invention may also comprise substrate particles coated with metal oxide in some other way, for example by precipitation from an organic solvent. For instance, DE-A-35 34 477 discloses the coating of aluminum pigments with $Fe_2O_3$ from alcoholic solutions of iron salts, and EP-A-328 906 discloses coating with $TiO_2$ from alcoholic solutions of organic titanic esters. In this case step a) would not be required. However, because of their better quality, substrates coated from the gas phase will always be preferable.

The process of the invention makes it possible to prepare multiply coated luster pigments in a simple manner. The thickness of the layers produced can be set specifically and reproducibly to the desired value via the coating time, the concentration of metal compound used and the ratio of initially charged pigment particles to added metal compound. The luster pigments obtained in this way are notable for the high quality of the coating, i.e. for homogeneous, uniform layers enrobing the substrate particles in film fashion, as is evident in the conductivity of the pigments doubly coated with an outer metal (e.g. molybdenum) or else magnetite layer and in the cleanness of hue and color strength not only of the doubly but also of the triply coated pigments.

The luster pigments of the invention are advantageous for many purposes, such as the coloring of paints, printing inks, plastics, glasses, ceramic products and decorative cosmetic preparations. Their special properties make them suitable for any other purposes. The metal-coated pigments, for example, could be used in electrically conductive or electromagnetically screening plastics, paints or coatings or in conductive polymers. The pronounced light/dark flop of the black-coated pigments in the application state and the color flop of the pigments coated triply with colored oxide make it possible to manufacture encaustic and effect inks, in particular for securities printing and for preparing forgery proof documents. The excellent hiding power of the triply coated pigments in particular frequently makes it possible to dispense with the otherwise necessary base coating, which is of particular interest for example in automotive coating.

EXAMPLES

Preparation of luster pigments according to the invention

The exemplified coatings of aluminum pigments were carried out in an externally heatable fluidized bed reactor made of glass, having a diameter of 8 cm and a height of 80 cm, and equipped with a glass frit bottom and filter socks, suspended from the top and to be cleaned with a nitrogen jet, and two gas injection nozzles situated on the side above the frit bottom.

To assess the coloristics of the pigments obtained, in each case 0.4 g of the pigment sample was suspended in 3.6 g of a mixed polyester lacquer having a solids content of 21% by weight and dispersed for 2 minutes in a Red Devil. A draw bar (wet film thickness 160 µm) was then used to prepare drawdowns of the pigment lacquers on a piece of black and white cardboard. After the film had dried the CIELAB values were measured with a DATACOLOR spectrophotometer MCS 111 having a metallic measuring head GK 111 at an angle difference of 20°–70° to the luster angle. The reported color coordinates (L, a*, b*) relate to the standard illuminant D 65 and a viewing angle of 25°. L is the lightness, a* the red/green content and b* the blue/yellow content. H is the hue angle and C chroma. The measurements were carried out on single drawdowns against a white background.

A) Preparation of doubly coated luster pigments

EXAMPLE 1 a) A mixture of 100 g of aluminum powder with an average particle diameter of 20 µm and a BET surface area of 4.5 $m^2/g$ and 100 g of a coarser aluminum powder (average particle diameter 60 µm, BET surface area 1.5 $m^2/g$) was heated to 190° C. in the fluidized bed reactor under fluidization with nitrogen at a total gas rate of 800 l/h, half of the nitrogen being passed through a reservoir of titanium tetrachloride temperature controlled at 40° C. In addition, air which had been passed through a water reservoir temperature controlled at 50° C. was blown in at 200 l/h. In this way 140 g of titanium tetrachloride were introduced over 12 h.

A drawdown of the resulting bluish shimmering, titaniumdioxide coated pigment gave the following CIELAB values: L=104.1, a*=0.5, b*=−5.9, C=5.9, H=274.9.

b) To coat the resulting pigment further with metallic iron the total rate of fluidizing nitrogen used was 800 l/h, of which half was passed through a room temperature reservoir of iron pentacarbonyl. In this way 400 g of $Fe(CO)_5$ were transferred into the 180°–220° C. reactor in the course of 20 h.

During the subsequent cooling of the reactor, the fluidizing gas was admixed with some air for passivating pyrophoric portions of the deposited iron layer.

The deep blue pigment obtained had an iron content of 19.7% by weight and a titanium content of 12.7% by weight.

A drawdown gave the following CIELAB values: L=72.4, a*=−3.2, b*=−14.0, C=14.4, H=257.0.

B) Preparation of triply coated luster pigments

EXAMPLE 2 a) The method of Example 1 was used to coat 200 g of an aluminum mixture by addition of 381 g of titanium tetrachloride.

b) To coat the pigment, which had a greenish yellow shimmer, further with metallic chromium, the fluidizing nitrogen was used at a total rate of 800 l/h, of which half was passed through an 80° C. reservoir of chromium hexacarbonyl. In this way 24 g of $Cr(CO)_5$ were transferred into the 190° C. reactor.

c) To effect additional coating of the resulting pigment with chromium oxide ($Cr_2O_3$) the same conditions as for step b) were selected. In addition air passed through a water reservoir temperature controlled at 35° C. was blown in at 200 l/h. In this way 48 g of $Cr(CO)_6$ were thermally decomposed.

The resulting greenish yellow pigment had a chromium content of 2.7% by weight and a titanium content of 22.7% by weight.

A drawdown produced the following CIELAB values: L=95.8, a*=−3.0, b*=7.8, C=8.3, H=111.0.

We claim:

1. A process for preparing a luster pigment, comprising the following successive steps:

(A) decomposing a volatile metal compound in the gas phase in the presence of oxygen and/or water vapor to coat a platelet-shaped substrate of aluminum or an alloy thereof with a first colorless or selectively absorbing layer of metal oxide, then (B) coating said first colorless or selectively absorbing layer of metal oxide with a non-selectively absorbing carbon layer by thermally decomposing an oxygen-containing hydrocarbon having a ratio of oxygen atoms to carbon atoms of at least 1 to 2, and (C) if desired, decomposing a volatile metal compound in the gas phase in the presence of oxygen and/or water vapor to coat a second colorless or selectively absorbing layer of metal oxide on said non-selectively absorbing layer.

2. The process of claim 1, comprising said steps (A) and (B), wherein said oxygen-containing hydrocarbon is a sugar.

3. A process for preparing a luster pigment, comprising the following successive steps:

(A) decomposing a volatile metal compound in the gas phase in the presence of oxygen and/or water vapor to coat a platelet-shaped substrate of aluminum or an alloy thereof with a first colorless or selectively absorbing layer of metal oxide, then (B) coating said first colorless or selectively absorbing layer of metal oxide with a non-selectively absorbing layer selected from the group consisting of a non-selectively absorbing metal, a non-selectively absorbing metal oxide, and mixtures thereof, by decomposing a volatile metal compound in the gas phase in the presence of either (i) an inert gas or (ii) oxygen and/or water vapor, and (C) if desired, decomposing a volatile metal compound in the gas phase in the presence of oxygen and/or water vapor to coat a second colorless or selectively absorbing layer of metal oxide on said non-selectively absorbing layer.

4. The process of claim 3, comprising said steps (A), (B) and (C), wherein said volatile metal compound in each of said decomposing steps (A), (B) and (C) is independently selected from the group consisting of metal carbonyls, metal halides, metal oxychlorides and metal alkoxides.

5. The process of claim 3, comprising said steps (A), (B) and (C), wherein said volatile metal compound of said step (B) is a metal carbonyl and said nonselectively absorbing layer is a metal.

6. The process of claim 3, comprising said steps (A) and (B), said coating step (B) is conducted in the presence of oxygen and/or water vapor, and said nonselectively absorbing layer is selected from the group consisting of magnetite, nickel oxide, cobalt oxide, vanadium oxide and mixtures thereof.

* * * * *